2,788,214
Patented Apr. 9, 1957

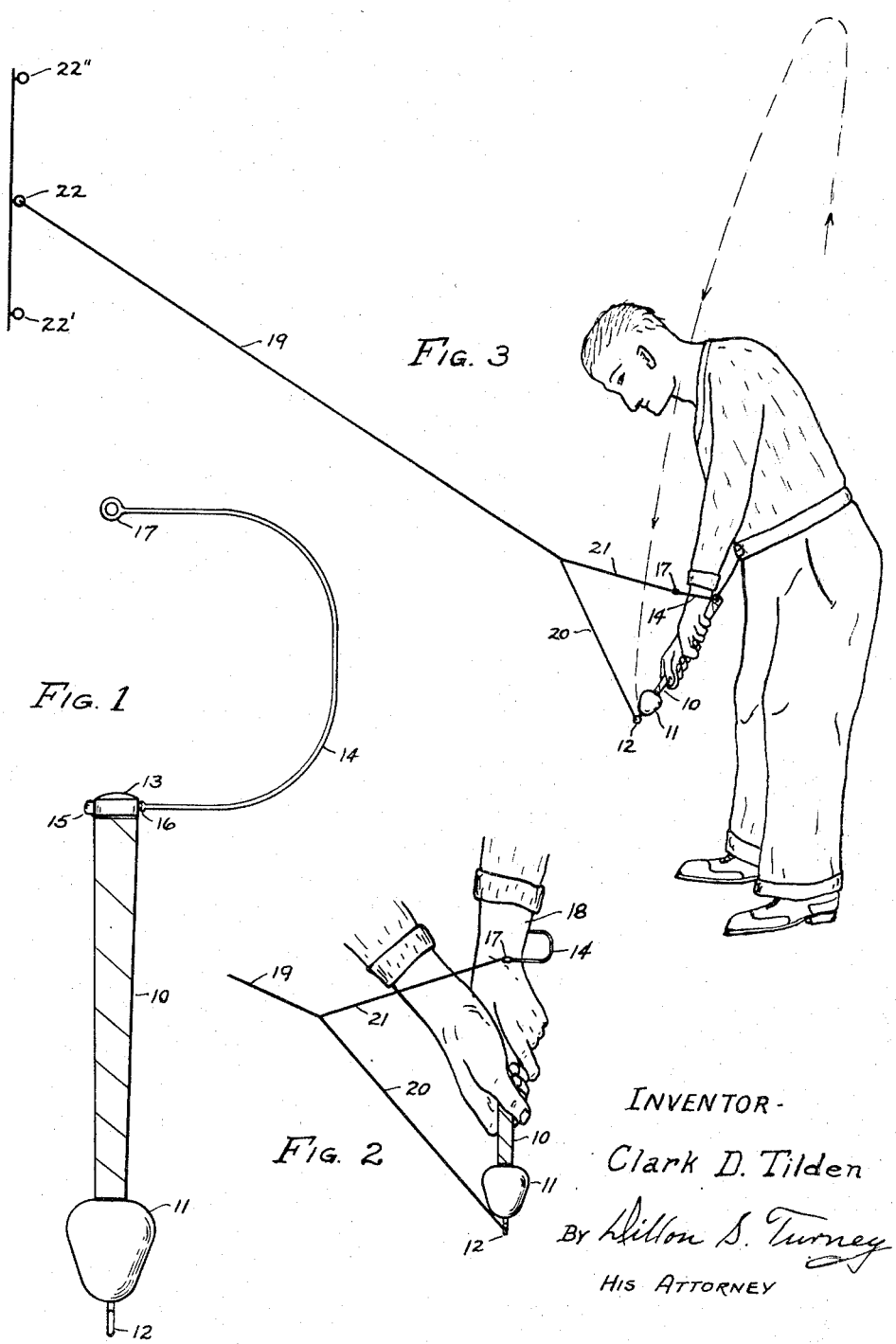

2,788,214
GOLF TEACHING AND PRACTICING DEVICE

Clark D. Tilden, Ames, Iowa

Application July 13, 1953, Serial No. 367,463

2 Claims. (Cl. 273—191)

My invention relates to a golf training device and more particularly to an improved device for enabling golfers to learn and practice the correct swing indoors as well as out-of-doors. It will also be apparent that this device can be used to teach and to practice the swinging of any other implement wherein a controlled wrist action and swing is desired such as with a baseball bat.

Many varied forms of golf teaching and practicing devices are known in which a restraining means of some form is utilized to force the golf club head and shaft to swing in a circular path, such forms including restraining members attached to the club head, circular tracks which guide the club and inside of which the golfer stands, and other mechanical arrangements which attempt to force the golfer to swing the club correctly. As a result of much practice and experimentation, I have found that these devices do not accomplish the desired result because they are based on an incorrect theory of the correct and proper swing. They incorrectly assume that the golf swing is a single arc with the club head swinging or rotating around a center located at or near the player's shoulders and neck. Actually, the proper golf swing is a double arc, the club head and shaft acting as a flail, as though it were hinged at the hands and swinging through one arc, and the player's hands and arms swinging through a second arc, the two arcs being independent of each other. I have found that if the golfer learns to properly swing the hands, concentrating on the thought that the weight or mass that he is swinging is located in his hands instead of at some remote point such as the club head, and if some restraint or enforcement is placed on the position of the wrists and the wrist action during the swing, it automatically follows that the action and swing of the club shaft and head will be correct and proper and that a marked improvement in the player's game results.

It is, therefore, an object of this invention to provide a simple, easily manufactured, economical device for teaching and practicing the golf swing.

It is a further object of this invention to provide a golf teaching and practicing device that may be used indoors and out-of-doors and which will teach the user the correct swing and enable him to obtain the feel of the correct golf swing.

It is another object of this invention to provide an improved device for teaching the swinging of a shafted implement which is effective to impose certain restraints on the wrist motion to insure that the wrist action is correct throughout all phases of the swing.

This invention will be best understood by reference to and consideration of the following detailed description taken in connection with the accompanying drawings, and its scope will be pointed out in the appended claims.

In the drawings, Figure 1 is a front view of my improved golf teaching device showing the wrist restraining member pivoted upwardly in order to give a clear view of the device. Figure 2 is a pictorial view from the front showing the device when properly gripped by a golfer; and Figure 3 is a perspective view from the side of a golfer addressing the ball and showing the arrangement of the device when in use for teaching or practicing purposes.

Referring now to Figure 1 of the drawing, the golf teaching device forming the subject of this invention consists of the short shaft or grip member 10 which is made to simulate the grip portion of a conventional golf club. Secured to the lower end of the grip member 10 is a mass or weight 11 which may be of any desired configuration, the main object being to insure that the center of gravity of the device is located near the hands of the golfer when the device is in use. At the lower extremity of the mass 11 an eye 12 is provided to which is secured a restraining cord as will be pointed out in detail further on in this description.

At the upper end of the grip member 10, a cap 13 serves to cover the end of the grip and secures the grip wrapping in place. A transverse hole is provided through the cap 13 in which one end of the curved wrist encircling bracket 14 is secured. The curved bracket 14 is formed of rigid light weight metal so that there will be no bending or resiliency in the bracket 14, and it is secured in place in the cap 13 by extending therethrough and being provided with a flattened end or button 15 at the outer end, and a flattened portion 16 on the other side of the cap 13 to hold the bracket in position in the cap 13. This construction allows the bracket 14 to pivot in a direction toward and away from the observer as viewed in Figure 1.

At the other or free end of the curved wrist bracket 14, an eye or loop 17 is formed therein for attachment to another restraining cord as will be subsequently pointed out.

Figure 2 shows the device viewed from the front when being gripped by a golfer and illustrates how the curved wrist encircling bracket 14 extends out and around the left wrist 18 of the golfer, sufficient clearance being provided so that at no part of the swing does the bracket 14 strike, contact or interfere with the wrists or arms of the user. The arrangement of the restraining cords which cooperate with the device 10 and form an essential part of this invention is best shown in Figure 3, which view shows a golfer in the normal position of addressing the ball and gripping the device 10 in the proper manner. A long flexible member 19 is provided at one end thereof with a 2-part or V-shaped extension comprising a lower part 20 and an upper part 21, the lower part 20 being secured to the eye 12 at the lower end of the device 10, and the upper part 21 being secured to the outer free end of the bracket 14 by means of the loop 17. The members 19, 20 and 21 may be of heavy cord, wire or other suitable flexible material as long as such material will not elongate or change length under tension. The opposite single end of the restraining cord 19 may be secured to any convenient support, such as a wall if indoors or a post or tree if out-of-doors, by means of the screw eyes or hooks 22, 22' and 22". The actual method of securing the end of the cord 19 is of minor importance, and it will be appreciated that any suitable support means or anchor may be used as long as the level of such support is at least equal to the heighth above the ground of that of the head of the golfer. It is also apparent that it may be desirable to vary this heighth to suit individual users and also to change the angle of the plane of the swing with respect to the ground. Obviously, if the support point is lowered to 22', the golfer's swing will be forced in a path more upright and approaching a vertical plane, whereas if the support point is raised to the uppermost level 22", the swing will be "flattened out" and the angle of the plane of the swing with respect to the ground will be smaller.

The action of the device in forcing the golfer to develop correct wrist position and action and to enable him to obtain the proper sense of feel of swinging the hands and not the club head will now be described. The user should grip the device 10 as shown in Figure 2, which illustrates a conventional golfer's grip on the shaft. With the restraining cord 19 attached as shown in Figure 3, the user then takes the position as though he were addressing the ball, and it will be noted that the cord 19 and its extensions 20 and 21 are held taut, thereby pulling the bracket 14 into alignment with the cord 21 by means of this tension. Thus the grip member 10 and consequently the hands of the player are definitely fixed in a predetermined angular position with respect to the support 22 and with respect to the arc of the swing as shown by the dotted line in Figure 3. It is important to note here that the device 10 and hands and wrists cannot be rotated or turned about the longitudinal axis of the device 10 because of the tension of the cords, especially cord 20, which hold the bracket 14 in the forward position as shown, that is, pulled directly toward the support 22. This is a most important feature of this invention, since it forces the player to maintain his wrists and hands in the same position throughout the arc of the swing and prevents "rolling or breaking" of the wrists during the backswing or downswing.

From the foregoing it can be seen that a device constructed along the lines shown and described herein also would be useful in teaching and practicing the swings used in other sports, such as baseball, where it is desired to teach that the wrists should be maintained in a certain angular position and not rotated about the longitudinal axis of the implement held in the player's grip.

Reference to Figure 3 will show that as the golfer swings, as shown by the dotted line, the device 10 and the player's hands will follow the arc of the swing and the device 10 will not rotate or change its angular position with respect to the support 22. Due to the novel method of attachment of the restraining cords, which prevent axial rotation of the device 10, these cords 20 and 21 and the wrist encircling bracket 14 in no way or manner touch or bind the golfer's hands and wrists nor do they hinder or interfere with his swing except to prevent hand and wrist rotation as previously explained and to force his hands to swing in a true arc from the shoulders. In practicing with the device it is only necessary to remember to maintain tension on the restraining cords 19, 20 and 21 at all times throughout the swing.

It may be desirable to change the relative lengths of the cords 20 and 21 slightly to accommodate for the physical build and characteristics of the individual user. The relative lengths of these cords will also depend on the player's desire to practice different golf shots, such as might be played with different clubs such as a driver, and iron, an approach club or a putter.

It is apparent that while I have shown my invention arranged for use by a right handed golfer, it is a simple matter to reverse the position of the curved bracket 14 so that the device can be used by left handed golfers or athletes. In such case, the bracket 14 would be curved to the left, as viewed in Figures 1 and 2, and the bracket 14 would encircle the right wrist of the left handed golfer. Therefore, it should be understood that my invention is equally adaptable for use by either right or left handed athletes.

As mentioned earlier, previous teaching and practicing devices have been based on the assumption that the correct golf swing was a matter of learning to swing the club head in a single arc with its center at or near the shoulders, and this has been found to be incorrect. The proper swing is produced by swinging the hands in an arc from the shoulders, the club acting as a flail as though it was hinged freely at the hands. This improved device enables the student to concentrate on swinging his hands through the proper arc and on maintaining them in proper position while swinging, and it has been found that once these correct swinging habits are impressed on the muscles by practice, the muscles will "remember" and repeat the correct swinging habits when the student transfers from this device to a conventional golf club or other implement.

While I have shown and described a particular form and embodiment of my invention, it will be obvious to those skilled in the art that changes and modifications may be made therein without departing from my invention in its broader aspects and I, therefore, aim in the appended claims to cover all such changes and modifications as fall within the true spirit and scope of my invention.

What I claim as new and desire to secure by Letters Patent of the United States is:

1. A golf swing practicing device comprising a straight shaft member adapted for gripping with both hands of the user, a cord attaching eye at the lower end thereof, a substantially semicircular rigid bracket connected to the upper end of said shaft member said bracket being rotatable with respect to said shaft member and arranged to partially encircle the hands and wrists of the user when in a shaft gripping position, a cord attaching eye at the free end of said bracket, a vertical support spaced from said shaft member, and means including flexible cords of fixed length interconnecting said support with both of said eyes for maintaining said shaft member in predetermined angular relationship with said support at all times.

2. A golf swing teaching and practicing device comprising a straight shaft member adapted for gripping with the hands and having an additional weighted portion positioned below the hands, cord attaching means located below said weighted portion, a curved rigid hand encircling bracket pivoted at one end thereof to the opposite end of said shaft member and having cord attaching means positioned at the free end thereof, a vertical support spaced from said shaft member and adjustable to various heights above the ground, and a flexible cord having a V-shaped extension at one end thereof the single end of said cord being attached to said support and the V-shaped end of said cord having one leg attached to said means at the free end of said bracket and the other leg secured to said attaching means below said weighted portion.

References Cited in the file of this patent

UNITED STATES PATENTS

| | | |
|---|---|---|
| 431,206 | Gloy | July 1, 1890 |
| 762,959 | Tothill | June 21, 1904 |
| 2,455,707 | Sheffer | Dec. 7, 1948 |
| 2,655,378 | Sheffer | Oct. 13, 1953 |